Patented Sept. 26, 1933

1,928,021

UNITED STATES PATENT OFFICE 1,928,021

PROCESS OF MAKING POROUS ARTICLES CONSISTING OF SILICA

George King, Oldbury, England, assignor of one-half to Albright & Wilson Limited, Oldbury, near Birmingham, England No Drawing. Application February 20, 1932, Serial No. 594,400, and in Great Britain March 6, 1931

3 Claims. (Cl. 18—47.5)

This invention relates to the manufacture of porous articles, such as plates, diaphragms or pots, which consist solely of silica.

In the art of making porous refractory materials, it is known to make subdivided refractory materials into a paste with carbon or a carbon compound, mould the paste and burn it at a temperature high enough to cause the refractory materials to sinter, during which operation the carbon burns away leaving the mass more or less porous. This method of working is expensive owing to the high temperature involved.

Heretofore, it has not been possible to make porous articles, such as plates, diaphragms or pots consisting solely of silica, because no cement has been known which, when fully set, will leave in the mass no residue other than silica.

The present invention solves the problem of making a porous article consisting solely of silica, without recourse to a temperature at which silica softens.

A paste is prepared by mixing silica with a suitably soluble body, for instance a metal carbonate, preferably calcium carbonate, and a liquid binder derived from a silicon ester, such as a solution made in the manner described in British Patent No. 290717. Such solution may be obtained by mixing silicon esters with aqueous alcohols. The mixture which at first separates into two layers, is stirred until a uniform solution is obtained. To the solution so obtained a further mixture of esters may be added. The water present in the solution reacts with the esters to form silica and an alcohol or a mixture of alcohols. In many cases, it is advantageous that the solution contain undecomposed esters, that is, the amount of water used should be less than that required to decompose the ester. The paste is then moulded to the required form, the moulded article is allowed to set and the soluble body is extracted from it by a solvent, for instance hydrochloric acid.

As an example of the invention, 200 grams of precipitated chalk are mixed with 800 grams of amorphous silica which has passed through a sieve having 300 meshes per square inch. The mixture is moistened with 135 cc. of a solution made as described in Example 1 of British Patent No. 290717, and then moulded under a pressure of half a ton per square inch, and allowed to set. The moulded article thus made is now immersed in a quantity of hydrochloric acid solution of 17 per cent. strength which is more than that chemically equivalent to the calcium carbonate in the article until no further evolution of carbon dioxide occurs. The article is then washed and dried.

It is preferable to grind the mixture of calcium carbonate and silica with a small quantity of water to form a paste, which is then dried and again ground before the operation of moistening with the solution made from silicon ester.

It is to be noted that the soluble body referred to in the following claims should not have such alkalinity as to coagulate the liquid binder, for instance the solution made as described in Example 1 of British Patent No. 290717.

Having thus described the nature of the said invention and the best means I know of carrying the same into practical effect, I claim:—

1. A process for the manufacture of porous articles consisting solely of silica comprising mixing silica with a soluble body and a liquid binder derived from a silicon ester, moulding the mixture to the required form and allowing it to set, and finally extracting by a solvent the soluble body from the mass which has set.

2. A process for the manufacture of porous articles consisting solely of silica comprising mixing finely divided amorphous silica with precipitated chalk, moistening the mixture with a silicon ester which has been mixed with an aqueous alcohol, moulding the mixture under pressure, allowing the moulded mass to set, and immersing the mass in a dilute acid to dissolve the precipitated chalk.

3. A process for the manufacture of porous articles consisting solely of silica comprising mixing finely divided amorphous silica with 25% of its weight of precipitated chalk, moistening the mixture with a silicon ethyl ester which has been mixed with aqueous alcohol containing water in quantity less than that which will decompose the ester, moulding the moistened mass, allowing the moulded mass to set and finally immersing the mass in a dilute acid to dissolve the precipitated chalk.

GEORGE KING.